April 29, 1969  R. L. MILLER  3,441,950
RECORDER INK RESERVOIR CONTAINING ANTI-BUBBLE MATERIAL
Filed Aug. 15, 1967

INVENTOR.
ROBERT L. MILLER
BY
John Shaw Stevenson
AGENT.

United States Patent Office 3,441,950
Patented Apr. 29, 1969

3,441,950
RECORDER INK RESERVOIR CONTAINING ANTI-BUBBLE MATERIAL
Robert L. Miller, Horsham, Pa., assignor to Honeywell Inc., Minneapolis, Minn., a corporation of Delaware
Filed Aug. 15, 1967, Ser. No. 660,820
Int. Cl. G01d 15/16
U.S. Cl. 346—140    6 Claims

ABSTRACT OF THE DISCLOSURE

The ink reservoir consists of a receptacle containing interconnected strands of skeletal fibrous material which minimizes air bubbles tending to be formed in the ink within the receptacle. The material is a polyurethane foam.

---

Figure 1:
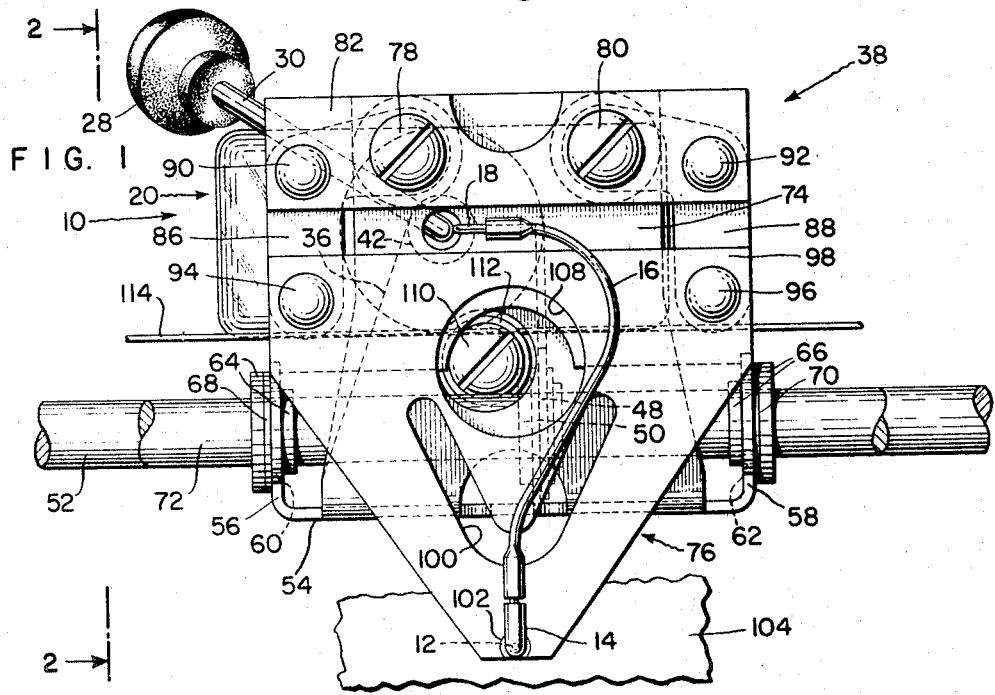

It is an object of the present invention to disclose one preferred form of the invention in the form of an inking apparatus that is capable of printing a continuous record on a recording surface while moving back and forth at rapid speeds thereon. This consists of a pen nib and a receptacle that contains ink and interconnected strands of skeletal fibrous material to minimize air bubbles tending to be formed in the ink within the receptacle as the inking apparatus is moved back and forth along the recording surface and the ink tends to be sloshed about in the receptacle.

It is an object of the invention to disclose a construction for an inking apparatus that comprises a unique ink receptacle and pen to continuously record a legible line representing a variable condition or other record on a chart when the pin is moved therealong at an abnormally low speed, a medium speed, or at a heretofore-undreamed-of high recording speed.

The recording apparatus disclosed herein employs capillary action to convey ink from a receptacle, such as a bottle, sack, or cartridge to a movable pen. Experimentation has shown that, when a pen is driven at speeds that exceed a value of fifty inches per second, it causes ink and a pocket of air above the ink in the receptacle to be sloshed against one another. This action causes air bubbles and foam to be formed in the ink. Such intermingling of air bubbles in the ink, thus, causes the nib of the pen to intermittently expel air, in place of ink, onto the chart paper on which it is making an ink record. Also, when foam is formed due to an accumulation of these bubbles the capillary action between the ink and the chart paper will become non-existant and the flow of ink from the receptacle and pen to the chart paper will be cut off. The entrapment of air bubbles in the ink will, thus, prevent the pen from making a continuous line on the chart at pen speeds that exceed approximately fifty inches per second.

It is an object of the present invention to disclose an apparatus which will eliminate air bubbles when inking apparatus of the aforementioned type are required to record an ink record on a chart and they are driven at speeds that exceed fifty inches per second.

It is an object of the present invention to provide an inking apparatus having an ink receptacle for a pen that has an interior filled with strands of fibrous material for example plastic foam from and through which ink can readily flow without blocking the capillary action that exists between the receptacle, pen, and the recording surface with which the pen is in contact.

It is another object of the invention to disclose an inking apparatus in which a plastic foam material in the form of a polyurethane foam is employed in its ink receptacle.

More specifically, it is another object of the present invention to disclose an inking apparatus having an ink cartridge for a pen whose interior is constructed of a plastic foam which is preferably a polyurethane foam that is very porous in that it has ten pores per linear inch and has strands that occupy only three percent of the air space occupied by this foam.

It is another object of the invention to disclose an inking apparatus having an ink cartridge for a pen whose interior contains a plastic foam of the aforementioned type whose loose and relatively widely separated strand structure will not adversely change the maximum ink volume capability of the system from one that does not possess such a plastic foam.

It is another object of the present invention to disclose an inking apparatus having an ink cartridge in which a plastic foam having high strength low density, good abrasive and chemically resistant characteristics are employed which is a form of urethane foam, namely a polyurethane.

It is another object of the present invention to disclose a skeletal plastic foam of the aforementioned type that can be beneficially employed to eliminate the aforementioned air bubbles problem when any type of ink is used with the foam including the ink mixture comprised of dyestuff, glycerin and a solution of polyethylene oxide as is disclosed in the William A. Forsyth, Jr. patent application, Ser. No. 646,476.

It is another object to provide a skeletal foam of the aforementioned type for a receptacle so that ink contained therein will not generate undesired air bubbles therein while it is transported along a bumpy road through a rough sea or a turbulent atmosphere.

Figure 2:
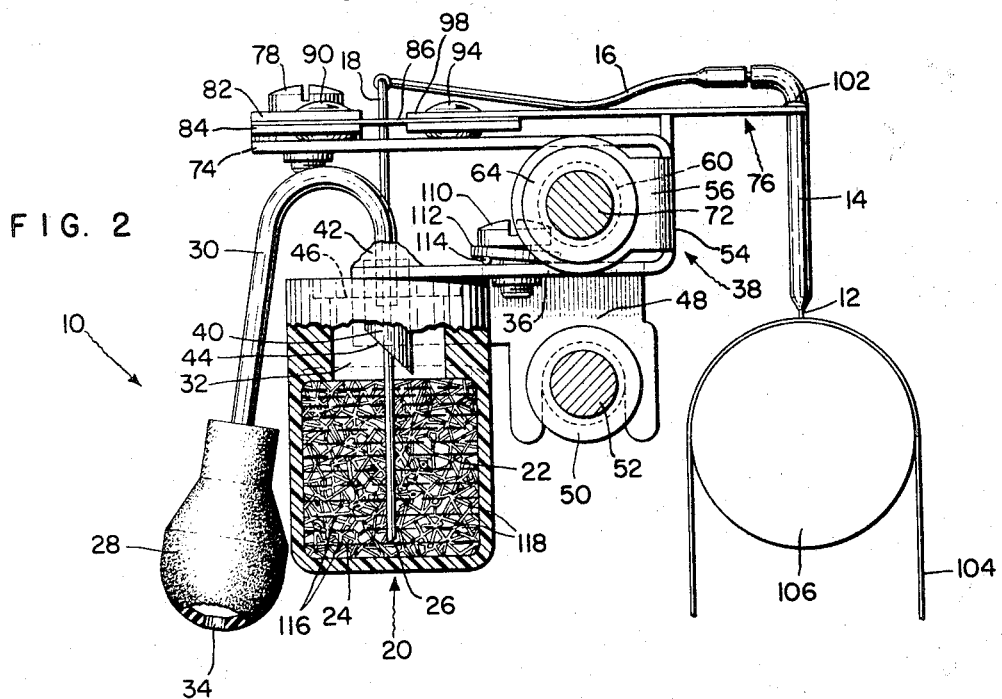

A better understanding of the present invention may be had when the following detailed description is read in connection with the accompanying drawing in which:

FIGURE 1 is a plan view of the inking apparatus and the slidable carriage to which it is attached and FIGURE 2 is a view taken along 2-2 of FIGURE 1.

The inking apparatus 10 as shown in FIGURE 1 has a nib 12 forming one end of a stylus 14, a flexible capillary tube 16, a rigid capillary tube 18, a receptacle 20 in the form of a sealed cartridge containing ink 22 and interconnected strands of fiberous material 24 through which the lower open end of the tube 18 has been passed by means of the sharp tapered edge on its lower end. The receptacle 20 is provided with a flexible bulb 28 and tube connection 30 that has one end opening into the upper part 32 of the receptacle 20 which only contains air.

A wall 34 is shown in FIGURE 2 forming an air passageway extending between the interior of the bulb 28 and the atmosphere. Priming of the ink 22 in the receptacle 20 in a direction towards the nib 12 during the initial stage of an inking operation is accomplished in a well known manner by having an operator place his thumb over the opening 34 in the bulb formed by wall 34 and depressing the bulb 28 while he retains the sides of the bulb between two of his other fingers.

The top surface of the receptacle 20 is shown in FIGURE 2 abutting an portion 36 of a pen carriage 38. The capillary tube 18 and the tube for supplying air pressure 30 are shown passing through a tubular member 40 and fixedly connect by suitable soldering 42 to the pen carriage portion 36.

The lower end of the tubular member 40 is provided with a sharp tapered edge 44 to enable the receptacle to be held in press fit engagement therewith when assembled as shown in FIGURE 2. This sharp edge 44 also provides an easy way of puncturing the sealed cap 46 of the ink sealed-in-receptacle 20 when it is assembled on the tubular member 40 by moving it upward into the position shown in FIGURE 2.

The carriage 38 has a U-shaped portion 48 that is integral with and which extends in a downward direction from the first portion 36. Retained between the legs of the U-shaped portion 48 is a split ring bearing 50 so that the carriage can be rotatably and slidably supported on the stationary shaft 52.

The carriage 38 has another U-shaped portion 54 that is integral with its first portion 36 and second portion 48. Each of the legs 56, 58 of the U-shaped portion 54 contain associated apertured wall portions 60, 62 into which split ring shaped rotatable sleeve bearings 64, 66 are respectively inserted.

The retaining ring 68, is shown encircling the sleeve bearing 64 and retaining ring 70 is shown encircling the other sleeve bearing 66 to prevent these bearings from slipping transversely on the leg portions 56, 58 with which they are associated. The legs of the U-shaped portion 54 and their bearings 64, 66 and retaining rings 68, 70 are assembled in slidable engagement as shown in FIGURES 1 and 2 on a stationary pen carriage shaft 72.

The carriage has a fourth portion 74 that is integral with the three previously mentioned portions 36, 48 and 54 of the pen carriage 38 and which has a stylus supporting portion 76 attached thereto by means of screw connection means 78, 80. More specifically, the screw connecting means 78, 80 are shown retaining two substantially rectangular plates 82, 84 in fixed relation with the fourth portion of the carriage 74.

Sandwiched between and extending away from each of the opposite end of the plates 82, 84 there is a leaf spring 86 and 88. Each of these leaf springs 86, 88 are retained in their respective positions by means of their associated rivets 90, 92.

The other end of the respective leaf springs 86, 88 are respectfully attached by the rivets 95, 96 to spaced-apart base portions 98 of the substantially triangular shaped pen supporting carriage plate 76 that has a V-shaped slotted out wall portion 100.

As shown in FIGURE 2 the outer end of the pen carriage plate 98 is thus free to flex in an up or down direction of the flexible leaf spring plates 86, 88 as the stylus 14, which is fixedly attached by solder 102 at its outermost end to the plate 98, is moved along the surface of a chart paper 104. This up and down action of the stylus 14 can thus take place as the chart paper 104 is passed over a chart roller 106 and the chart paper 104 is moved between a chart supply and a chart take-up spool, not shown.

The pen carriage plate 98 has an access apertured wall portion 108 through which a screw driver, not shown, can be inserted to rotate the screw member 110 to, for example, force the head of the screw 110 that is threadedly connected to the carriage plate 36 in a downward direction. This action will thereby cause the washer 112 to be pressed into driving engagement against the pen carriage drive cable 114.

From the aforementioned description of the carriage 38 it can be seen that the pen carriage 38 will be moved when a balancing motor driven drum associated for example with a potentiometric measuring circuit, not shown, causes the drive cable 114 to be pulled to the right or left of the position shown when the magnitude of a variable being measured by the potentiometric circuit is increased or decreased.

OPERATION

As the carriage 38 is moved back and forth along the chart 114 during a change in the magnitude of a variable, the ink 22 will be fed by the capillary action taking place in capillaries 18, 16, stylus 14, the nib 12 onto the moving chart paper 104 to record the magnitude of this variable.

If bubbles or foam are formed in the ink the capillary action between the ink 22 and the chart paper 104 will become nonexistent and the flow of ink 22 from the receptacle 20, capillary 18, 16, stylus 14 and nib 12 to the chart paper 104 will be cut off.

While the receptacle 20 is moved in this back and forth direction with the carriage 38 the ink 22 in the receptacle will have a tendency to be moved due to its inertial force in a back and forth manner therein. As particles of the ink 22 moving in this manner are forced from one portion of the skeletal fiberous material 24 to another this skeletal material 24 will tend to minimize the undesired sloshing action of the ink 22 and thereby reduce the tendency of the ink 22 to form bubbles or foam therein from the air above the ink in the receptacle 20.

Another advantage of using this skeletal fibrous material in the receptacle 20 such as a very porous urethane foam is that if any air bubbles are formed in the ink 22 they will burst as they encounter one of the many thornlike portions e.g. 116, 118 that are inherent in this skeletal fibrous material.

The strands of this fibrous material is preferably constructed of a tough, elastic abrasive and chemical resistant construction and which is chemically inert to the fluid such as ink, gasoline or other fluid with which it is associated.

The use of a skeletal plastic foam can be beneficially employed with all types of ink to minimize air bubbles that tend to be formed in the ink during movement of an ink filled cartridge not only over a bumpy terrain, over a rough sea or through a turbulent atmosphere but also while it is being moved back and forth across a recording medium with a pen to inscribe a record thereon.

Because bubbles do not form under the aforementioned conditions substantially all the ink can be drawn by capillary action without interruption from the cartridge to a recording medium to record a continuous record thereon.

For the aforementioned reason the presence of this skeletal plastic foam makes it possible for ink to continue to flow from a cartridge through a capilliary and pen onto a recording medium until substantially all the ink in the cartridge is removed and the cartridge is bone dry.

Skeletal plastic foam has also been found to be useful in substantially eliminating bubbles from ink that is comprised of .3 to 2% dystuff, 12 to 14% glycerin and .17 to .23% of a solution of polyethylene oxide which ink is disclosed in the William A. Forsyth, Jr., patent application Ser. No. 646,476.

Expermination has shown that a very porous polyurethane foam having ten pores per linear inch and which occupies three percent of the air space occupied by this foam in one such skeletal urethane foam that will (a) eliminate the tendency of sloshed about ink or other liquid in a receptacle to bubble or foam (b) cause the bursting of any air bubbles that are formed in the ink 22 to take place (c) allow capillary action to take place in the receptacle because of the very porous nature of the foam contained therein and (d) to allow nearly every drop of ink in the receptacle to be economically used by the nib of the stylus to record a record on the chart.

The embodiments of the invention in which an exclusive property or privilege is claimed are defined as follows:

1. An inking apparatus, comprising a receptacle adapted to contain ink, and having loose interconnected strands of skeletal fibrous material extending throughout a major portion of the interior of the receptacle, a nib adapted to ride upon a moving recording surface to record information thereon, an outlet for the receptacle communicating with the nib and said receptacle and outlet being operably connected for movement with the nib, said loose fibrous material being operable to minimize air bubbles tending to be formed in the ink contained within said receptacle and to immediately effect a bursting of any bubbles tending to be formed therein as the inking apparatus is moved back and forth along the recording surface and as the ink in the receptacle thereby tends to be sloshed.

2. The inking apparatus defined in claim 1 wherein the strands of fibrous material is of a skeletal foam construction which will obviate the tendency of the ink to become turbulant and wherein the ink within the receptacle contains .3 to 2 percent dystuff, 12 to 14 percent glycerin and .17 to .23 percent of a solution of polyethylene oxide.

3. The inking apparatus defined in claim 1 wherein the strands of fibrous material is of a synthetic foam construction and the outlet has its ink receptacle end embedded in the fibrous material.

4. The inking apparatus defined in claim 1 wherein the strands of fibrous material is of a polyurethane foam construction that contains at least ten pores per linear inch.

5. The inking apparatus defined in claim 1 wherein the strands of fibrous material is of a polyurethane foam construction that contains at least ten pores per linear inch and which pores occupy a maximum three percent of the air space occupied by the foam material within the receptacle.

6. The inking apparatus defined in claim 1 wherein the strands of fibrous material is of a polyurethane foam that is of a skeletal construction and which contains irregularly spaced apart thorn shaped edges.

References Cited

UNITED STATES PATENTS

| 2,305,923 | 12/1942 | Held | 220—88 |
| 2,335,633 | 11/1943 | Beecher | 346—140 |
| 3,247,519 | 4/1966 | Sihvonen | 346—140 |

FOREIGN PATENTS 494,457  3/1930  Germany.

RICHARD B. WILKINSON, *Primary Examiner*

JOSEPH W. HARTARY, *Assistant Examiner*

U.S. Cl. X.R.

220—85